(12) United States Patent
Cho et al.

(10) Patent No.: US 9,577,258 B2
(45) Date of Patent: Feb. 21, 2017

(54) METHOD OF PREPARING COMPOSITE CATHODE ACTIVE MATERIAL, COMPOSITE CATHODE ACTIVE MATERIAL, AND CATHODE AND LITHIUM BATTERY CONTAINING THE COMPOSITE CATHODE ACTIVE MATERIAL

(71) Applicant: Samsung SDI Co., Ltd., Yongin-si, Gyeonggi-do (KR)

(72) Inventors: Sang-Woo Cho, Yongin-si (KR); Chang-Wook Kim, Yongin-si (KR); Ji-Hyun Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 67 days.

(21) Appl. No.: 14/617,850

(22) Filed: Feb. 9, 2015

(65) Prior Publication Data

US 2015/0287990 A1    Oct. 8, 2015

(30) Foreign Application Priority Data

Apr. 4, 2014   (KR) ........................ 10-2014-0040740

(51) Int. Cl.
*H01M 4/13*   (2010.01)
*H01M 4/505*   (2010.01)
(Continued)

(52) U.S. Cl.
CPC .............. *H01M 4/505* (2013.01); *C01G 53/50* (2013.01); *H01M 4/525* (2013.01);
(Continued)

(58) Field of Classification Search
CPC .. C01G 53/50; C01P 2002/72; C01P 2002/74; C01P 2004/03; C01P 2004/20; C01P 2004/61; C01P 2006/12; C01P 2006/40; H01M 10/052; H01M 2004/021; H01M 4/505; H01M 4/525
See application file for complete search history.

(56) References Cited

U.S. PATENT DOCUMENTS

2009/0239148 A1\* 9/2009 Jiang ..................... H01M 4/131
 429/221
2012/0308881 A1\* 12/2012 Tokuda ............. H01M 10/0567
 429/199

(Continued)

FOREIGN PATENT DOCUMENTS

JP    2010-192424 A    9/2010
JP    2012-038564 A    2/2012

(Continued)

*Primary Examiner* — Patrick Ryan
*Assistant Examiner* — Ben Lewis
(74) *Attorney, Agent, or Firm* — Knobbe Martens Olson & Bear LLP (57) ABSTRACT

Provided are a method of preparing a cathode active material, a composite cathode active material, and a cathode and a lithium battery containing the composite cathode active material. The method includes mixing a transition metal source and a reducing agent to prepare a cathode active material precursor; and mixing and calcining the cathode active material precursor to prepare a lithium transition metal oxide, wherein a supplied amount of the reducing agent is about 0.003 mole/hr or less with respect to 1 mole/hr of a supplied amount of the transition metal source.

18 Claims, 4 Drawing Sheets

(51) Int. Cl.
*H01M 4/525* (2010.01)
*C01G 53/00* (2006.01)
H01M 10/052 (2010.01)
H01M 4/02 (2006.01)

(52) U.S. Cl.
CPC ...... *C01P 2002/72* (2013.01); *C01P 2002/74* (2013.01); *C01P 2004/03* (2013.01); *C01P 2004/20* (2013.01); *C01P 2004/61* (2013.01); *C01P 2006/12* (2013.01); *C01P 2006/40* (2013.01); *H01M 10/052* (2013.01); *H01M 2004/021* (2013.01)

(56) References Cited

U.S. PATENT DOCUMENTS

| | | |
|---|---|---|
| 2013/0209871 A1 | 8/2013 | Kato et al. |
| 2013/0266868 A1 | 10/2013 | Sun et al. |

FOREIGN PATENT DOCUMENTS

| | | |
|---|---|---|
| JP | 2012-169066 A | 9/2012 |
| KR | 10-2012-0028071 | 3/2012 |

* cited by examiner

METHOD OF PREPARING COMPOSITE CATHODE ACTIVE MATERIAL, COMPOSITE CATHODE ACTIVE MATERIAL, AND CATHODE AND LITHIUM BATTERY CONTAINING THE COMPOSITE CATHODE ACTIVE MATERIAL

CROSS-REFERENCE TO RELATED APPLICATION

This application claims the benefit of Korean Patent Application No. 10-2014-0040740, filed on Apr. 4, 2014, in the Korean Intellectual Property Office, the disclosure of which is incorporated herein in its entirety by reference.

BACKGROUND

Field

One or more embodiments relate to a method of preparing a composite cathode active material, a composite cathode active material, and a cathode and a lithium battery containing the composite cathode active material.

Description of the Related Art

In general, a cathode active material for a lithium battery is a transition metal compound or a lithium transition metal oxide such as $LiNiO_2$, $LiCoO_2$, $LiMn_2O_4$, $LiFePO_4$, $LiNi_xCo_{1-x}O_2$ ($0 \leq x \leq 1$), or $LiNi_{1-x-y}Co_xMn_yO_2$ ($0 \leq x \leq 0.5$ and $0 \leq y \leq 0.5$). The cathode active material has a limited electrical capacity.

Thus, a novel cathode active material having various structures is suggested. In particular, composite oxides have been suggested according to demand for high capacity batteries.

For example, one of the composite oxides is a $xLi_2MO_3$-$(1-x)LiMeO_2$ (where, $0<x<1$, M and Me are a transition metal) having a layer structure. In the preparation process of the composite oxide, an initial capacity of the cathode active material may be deteriorated since a previous oxidation of one of the transition metals results in the formation of a cathode active material precursor having a separate additional phase.

Therefore, a cathode active material having an improved discharge capacity and life characteristics by suppressing a formation of an additional phase during a preparation process of a cathode active material precursor is needed.

SUMMARY

One or more embodiments include a method of preparing a novel composite cathode active material.

One or more embodiments include a novel composite cathode active material.

One or more embodiments include a cathode including the composite cathode active material.

One or more embodiments include a lithium battery containing the cathode.

Additional aspects will be set forth in part in the description which follows and, in part, will be apparent from the description, or may be learned by practice of the presented embodiments.

According to one or more embodiments, a method of preparing a composite cathode active material includes mixing a transition metal source and a reducing agent to prepare a composite cathode active material precursor; and mixing and calcining the composite cathode active material precursor and a lithium source to prepare a lithium transition metal oxide, wherein a supplied amount of the reducing agent is 0.015 mole/hr or less with respect to 1 mole/hr of the transition metal source.

According to one or more embodiments, a composite cathode active material includes a lithium transition metal oxide represented by Formula 1, wherein secondary particles of the composite cathode active material are formed by binding primary particles of the composite cathode active material, an average particle diameter (D50) of the secondary particles is 5 μm or less, a specific surface area of the composite cathode active material is about 3.0 m2/g or more, an initial discharge capacity of the composite cathode active material is about 260 mAh/g or more, and the primary particles have a plate shape:

<Formula 1> wherein, in Formula 1, $x+a+b+c=1$; $0<x\leq 0.5$, $0<a<1$, $0<b<1$, $0<c<1$, and $0\leq d\leq 0.1$.

According to one or more embodiments, a cathode includes the composite cathode active material.

According to one or more embodiments, a lithium battery contains the cathode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, according to one or more embodiments, a method of preparing a composite cathode active material, a composite cathode active material, a cathode including the composite cathode active material, and a lithium battery containing the cathode will be described in detail.

According to an embodiment, a method of preparing a composite cathode active material includes mixing a transition metal source and a reducing agent to prepare a composite cathode active material precursor; and mixing and calcining the composite cathode active material precursor and a lithium source to prepare a lithium transition metal oxide, where a supplied amount of the reducing agent to is about 0.015 mole/hr with respect to 1 mole/hr of a supplied amount of the transition metal source.

In the method, by controlling a supplied amount of the reducing agent to about 0.15 mole/hr or less, an initial discharge capacity and life-span characteristics of the prepared composite cathode active material may be enhanced since a production of an additional phase as individual oxidation of a transition metal is suppressed. In the method, when the supplied amount of the reducing agent is excessively large or when all the reducing agent is added at one-time, the composite cathode active material precursor may not be prepared.

In the method, a supplied amount of the reducing agent may be about more than 0 mole/hr to about 0.015 mole/hr or less with respect to a supplied amount of the transition metal source of 1 mole/hr. For example, a supplied amount of the reducing agent may be about more than 0 mole/hr to about 0.0125 mole/hr or less with respect to a supplied amount of the transition metal source of 1 mole/hr. For example, a supplied amount of the reducing agent may be about more than 0 mole/hr to about 0.01 mole/hr or less with respect to a supplied amount of the transition metal source of 1 mole/hr. For example, a supplied amount of the reducing agent may be about more than 0 mole/hr to about 0.0075 mole/hr or less with respect to a supplied amount of the transition metal source of 1 mole/hr. For example, a supplied amount of the reducing agent may be about 0.0001 mole/hr to about 0.0075 mole/hr or less with respect to a supplied amount of the transition metal source of 1 mole/hr. When a supplied amount of the reducing agent is within the ranges, a composite cathode active material may have improved charging/discharging characteristics.

In the method, the mixing of the transition metal source and the reducing agent is performed by continuously or intermittently supplying each of a first solution including a transition metal source and a second solution including the reducing agent to a reactor. When the reducing agent is added without diluting with a solvent or added all at once in diluted state, a composite cathode active material precursor may not be prepared.

In the method, a concentration of the reducing agent of the second solution may be about 350 mM or less. For example, a concentration of the reducing agent of the second solution may be from about 1 mM to about 350 mM. For example, a concentration of the reducing agent of the second solution may be from about 1 mM to about 300 mM. When a concentration of the reducing agent of the second solution is too high or too low, a composite cathode active material precursor may not be prepared.

In the method, a supplied amount of the second solution may be about 40 ml/hr. For example, a supplied amount of the second solution may be from about 0.1 ml/hr to about 40 ml/hr. For example, a supplied amount of the second solution may be from about 0.1 ml/hr to about 35 ml/hr. For example, a supplied amount of the second solution may be from about 0.1 ml/hr to about 30 ml/hr. For example, a supplied amount of the second solution may be from about 0.1 ml/hr to about 25 ml/hr. When a supplied amount of the second solution is too high or too low, a composite cathode active material precursor may not be prepared.

In the method, a concentration of the transition metal source of the first solution may be about 2 M or higher. For example, a concentration of the transition metal source of the first solution may be about 2.2 M or higher. When a concentration of the transition metal source is too low, a concentration of the reducing agent source relatively increases, and thus a composite cathode active material precursor may not be prepared.

In the method, a supplied amount of the first solution may be about 300 ml/hr or more. For example, a supplied amount of the first solution may be about 350 ml/hr or more. For example, a supplied amount of the first solution may be about 360 ml/hr or more. For example, a supplied amount of the first solution may be about 370 ml/hr or more. For example, a supplied amount of the first solution may be about 380 ml/hr or more. When a supplied amount of the first solution is too small, a supplied amount of the reducing agent relatively increases, and thus a composite cathode active material precursor may not be prepared.

In the method, the transition metal source may include at least one selected from the group consisting of a nickel source, a cobalt source, and a manganese source. However, the transition metal source is not limited thereto, and any transition metal source available in the art may be used. Also, in the method, an alkali metal source or an alkali earth metal source may be used in addition to the transition metal source.

In the method, the transition metal source may be at least one selected from the group consisting of a sulfate of a transition metal, a nitrate of a transition metal, an acetate of a transition metal, a chloride of a transition metal, a phosphate of a transition metal, and a mixture thereof. However, the transition metal source is not limited thereto, and any compound available in the art may be used as a transition metal source.

In the method, the lithium source may be at least one selected from the group consisting of a lithium nitrate, a lithium acetate, a lithium carbonate, a lithium hydroxide, and a mixture thereof. However, the transition metal source is not limited thereto, and any material available in the art may be used as a lithium source. For example, the lithium source may be a lithium carbonate.

In the mixing of a transition metal source and a reducing agent, a complexing agent may be additionally mixed with the mixture. The complexing agent is not particularly limited as long as the complexing agent binds with a transition metal ion and forms a chelate in the mixture. Examples of the complexing agent may include ammonia water, ammonium sulfate, ammonium chlorate, ammonium carbonate, ammonium fluoride, and ethylenediamine acetic acid.

In the mixing of a transition metal source and a reducing agent, a pH adjuster may be added to adjust pH of the mixture. For example, the pH adjuster may be a sodium hydroxide or a potassium hydroxide.

In the mixing of a transition metal source and a reducing agent, the mixture may be basic. For example, pH of the mixture may be 10 or higher.

In the mixing of a transition metal source and a reducing agent, a composite cathode active material precursor may be co-precipitated in an aqueous solution and thus obtained as a precipitate.

In the method, a molar ratio of the composite cathode active material precursor and the lithium source may be from about 1:1.05 to about 1:1.50. A molar ratio of a transition metal of the composite cathode active material precursor and lithium of the lithium source may be from about 1:1.05 to about 1:1.50. For example, a molar ratio of the composite cathode active material precursor and the lithium source may be from about 1:1.20 to about 1:1.50. For example, a molar ratio of the composite cathode active material precursor and the lithium source may be from about 1:1.30 to about 1:1.45. When a molar ratio of the composite cathode active material precursor and the lithium source is within the ranges, a cathode active material may have an improved initial capacity.

In the method, a first peak is observed at a diffraction angle (2θ) of about 19.10°±0.50° and a second peak is observed at a diffraction angle (2θ) of about 37.2°±0.50° in an X-ray diffraction (XRD) spectrum of the composite cathode active material precursor, and an intensity ratio of the second peak to the first peak (I2/I1) may be about 0.30 or greater. For example, in the XRD spectrum of the composite cathode active material precursor, a first peak is observed at a diffraction angle (2θ) of about 19.10°±0.50° and a second peak is observed at a diffraction angle (2θ) of about 37.2°±0.50°, and an intensity ratio of the second peak to the first peak (I2/I1) may be about 0.40 or greater.

In the method, production of an additional phase, such as Mn3O4, in the composite cathode active material precursor may be suppressed by using the reducing agent. For example, as shown in the XRD spectrum of FIG. 1, peaks corresponding to Mn3O4 present from about 30° to about 40° in a spectrum of a composite cathode active material precursor prepared in Comparative Example 5 are not observed in a spectrum of a composite cathode active material precursor prepared in Example 5. This is because oxidation of Mn is suppressed by the reducing agent.

In the method, the reducing agent may be a reducing sugar. The reducing sugar has a mild reducing strength and thus may suppress oxidation of a transition metal, such as Mn. The reducing sugar is a sugar that has an aldehyde group in a molecule or that may form an aldehyde group in an aqueous solution. For example, the reducing agent may be at least one selected from the group consisting of glucose, glycealdehyde, galactose, lactose, maltose, and fructose. However, the reducing sugar is not limited thereto, and any reducing sugar available in the art may be used. For example, sucrose is not a reducing sugar and thus may not serve as a reducing agent in the method.

For example, the lithium transition metal oxide prepared in the method may include a compound represented by Formula 1 below:

Li[Li$_x$Ni$_a$Co$_b$Mn$_c$]O$_2$+$d$ <Formula 1>

In Formula 1, x+a+b+c=1; 0<x≤0.5, 0<a<1, 0<b<1, and 0<c<1; and 0≤d≤0.1.

For example, in Formula 1, 0.1≤x≤0.5, 0<a<0.5, 0<b<0.3, and 0.5<c<1. For example, in Formula 1, 0.2≤x≤0.5, 0<a<0.4, 0<b<0.2, and 0.5<c<1. For example, in Formula 1, 0.3≤x≤0.5, 0<a<0.5, 0<b<0.3, and 0.5<c<0.8.

For example, the lithium transition metal oxide prepared in the method may include a compound represented by Formula 2 below:

$p$Li2MnO3-(1-$p$)LiNi$_a$Co$_b$Mn$_c$O2 <Formula 2>

In Formula 2, 0<p<1, 0<a<1, 0<b<1, 0<c<1, and a+b+c=1

For example, in Formula 2, 0.1<p<0.9. For example, in Formula 2, 0.2<p<0.8. For example, in Formula 2, 0.3<p<0.7.

In the method, the calcining may be performed in the air atmosphere at a temperature of about 700° C. to about 1000° C. for about 5 hours to about 30 hours. When the calcining temperature is lower than 700° C., particle growth may be insufficient, and when the calcining temperature is higher than 1000° C., a size of the secondary particles may be too big. When the calcining time is less than 5 hours, particle growth may be insufficient, and when the calcining time is more than 30 hours, a size of the secondary particles may be too big.

According to another embodiment, a composite cathode active material includes a lithium transition metal oxide represented by Formula 1, and the composite cathode active material has secondary particles, wherein an average particle diameter (D50) of the secondary particles is about 5 μm or less, a specific surface area of the composite cathode active material is about 3.0 m2/g or greater, an initial discharge capacity of the composite cathode active material is about 260 mAh/g or greater, the secondary particles are formed by binding the primary particles, and the primary particles have a plate shape.

Li[Li$_x$Ni$_a$Co$_b$Mn$_c$]O$_2$+$d$ <Formula 1>

In Formula 1, x+a+b+c=1; 0<x≤0.2, 0<a<1, 0<b<1, 0<c<1; and 0≤d≤0.1.

The composite cathode active material may have a high initial discharge capacity as the composite cathode active material is prepared from a composite cathode active material precursor prepared by suppressing production of an unnecessary additional phase by using a reducing agent. Also, the composite cathode active material may have a large specific surface area due to a plate shape of the particles. Therefore, the composite cathode active material may have high rate characteristics and improved life characteristics.

A specific surface area of the composite cathode active material may be about 3.0 m2/g or greater. For example, a specific surface area of the composite cathode active material may be about 3.5 m2/g or greater. For example, a specific surface area of the composite cathode active material may be about 4.0 m2/g or greater. When a specific surface area of the composite cathode active material is less than 3.0 m2/g, high rate characteristics and/or life characteristics of the composite cathode active material may deteriorate. When a specific surface area of the composite cathode active material is 3.0 m2/g or greater, a transfer pathway of lithium in an electrode reduces, and thus high rate characteristics and/or life characteristics of the composite cathode active material may improve.

An average particle diameter (D50) of the secondary particles of the composite cathode active material may be about 5.0 μm or less. For example, an average particle diameter (D50) of the secondary particles of the composite cathode active material may be about 4.5 μm or less. When an average particle diameter of the secondary particles of the composite cathode active material is too large, a tap density may increase.

In the composite cathode active material represented by Formula 1, 0.1≤x≤0.5, 0<a<0.5, 0<b<0.3, and 0.5<c<1. For example, in Formula 1, 0.2≤x≤0.5, 0<a<0.4, 0<b<0.2, and 0.5<c<1. For example, in Formula 1, 0.3≤x≤0.5, 0<a<0.5, 0<b<0.3, and 0.5<c<0.8.

Alternatively, the lithium transition metal oxide in the composite cathode active material may be a compound represented by Formula 2 below:

$p$Li2MnO3-(1-$p$)LiNi$_a$Co$_b$Mn$_c$O2 <Formula 2>

In Formula 2, 0<p<1, 0<a<1, 0<b<1, 0<c<1, and a+b+c=1.

For example, in Formula 2, 0.1<p<0.9. For example, in Formula 2, 0.2<p<0.8. For example, in Formula 2, 0.3<p<0.7.

A thickness of the primary particles in the composite cathode active material may be about 200 nm or less. For example, a thickness of the primary particles in the composite cathode active material may be about 180 nm or less. For example, a thickness of the primary particles in the composite cathode active material may be about 160 nm or less. For example, the primary particles may be a plate-like 2-dimentional nanostructure. A thickness of the primary particles is limited to 200 nm or less, but a diameter of the primary particles may be about 1 μm or greater, e.g., microsize.

In the composite cathode active material, an aspect ratio of a thickness and a length of the primary particles may be about 1:5 or greater. For example, an aspect ratio of a thickness and a length of the primary particles may be about 1:10 or greater. For example, an aspect ratio of a thickness and a length of the primary particles may be about 1:20 or greater. The length may be a diameter of a 2-dimentional plane formed by the plate of the primary particles. When the longest length and the shortest length of the plane formed by the plate of primary particles are different, the length may be the longest length.

The composite cathode active material may be a calcined product of the composite cathode active material precursor and the lithium source. In the XRD spectrum of the composite cathode active material precursor, a first peak may be observed at a diffraction angle (2θ) of about 19.1°±0.50°, a second peak may be observed at a diffraction angle (2θ) of about 37.2°±0.50°, and an intensity ratio (I2/I1) of the second peak to the first peak may be about 0.30 or more. The composite cathode active material precursor may not have a peak corresponding to Mn3O4.

According to another embodiment, the cathode may include the composite cathode active material described above For example, a cathode may be prepared by using the following method:

First, a composite cathode active material, a conducting agent, a binding agent, and a solvent are mixed to prepare a cathode active material composition. The cathode active material composition may be coated directly on an aluminum current collector and dried to prepare a cathode plate on which a cathode active material layer is formed. Alternatively, the cathode active material composition may be cast on a separate support to form a cathode composition film, which is then peeled from the separate support and laminated on an aluminum current collector to prepare a cathode plate with a cathode active material layer formed thereon.

Examples of the conducting agent include carbon black, graphite particulates, natural graphite, artificial graphite, acetylene black, ketjen black, and carbon fibers; carbon nanotubes; metal powder, metal fibers, or metal tubes of copper, nickel, aluminum, or silver; and a conductive polymer such as polyphenylene derivatives. However, the conducting agent is not limited thereto, and any conducting agent available in the art may be used.

Examples of the binder include a vinylidene fluoride/hexafluoropropylene copolymer, polyvinylidene fluoride (PVDF), polyacrylonitrile, polymethyl methacrylate, polytetrafluoroethylene, mixtures thereof, and a styrene butadiene rubber polymer. Examples of the solvent include N-methyl-pyrrolidone (NMP), acetone, and water. However, the binder and the solvent are not limited thereto, and any material available for these purposes in the art may be used.

Alternatively, a plasticizer may be further added to the cathode active material composition to form a cathode plate with pores.

The amounts of the composite cathode active material, the conducting agent, the binder, and the solvent are those that are generally used in the manufacture of a lithium battery. At least one selected from the group consisting of the conducting agent, the binder, and the solvent may not be used according to the use and the structure of the lithium battery.

In another embodiment, the cathode may further include a conventional cathode active material in addition to the composite cathode active material.

The conventional cathode active material may be any one available in the art, for example, may be a lithium-containing metal oxide. For example, at least one of lithium composite oxides with metals selected from among cobalt, manganese, nickel, and a combination thereto may be used. Examples of lithium metal oxides are compounds represented by the following formulas: $Li_aA_{1-b}B_bD_2$ (where, $0.90 \leq a \leq 1$ and $0 \leq b \leq 0.5$); $Li_aE_{1-b}B_bO_{2-c}D_c$ (where, $0.90 \leq a \leq 1$, $0 \leq b \leq 0.5$, and $0 \leq c \leq 0.05$); $LiE_{2-b}B_bO_{4-c}D_c$ (where, $0 \leq b \leq 0.5$ and $0 \leq c \leq 0.05$); $Li_aNi_{1-b-c}Co_bB_cD_\alpha$ (where, $0.90 \leq a \leq 1$, $0 \leq b \leq 0.5$, $0 \leq c \leq 0.05$, and $0 \leq \alpha \leq 2$); $Li_aNi_{1-b-c}Co_bB_cO_{2-\alpha}F_\alpha$ (where, $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (where, $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (where, $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_\alpha$ (where, $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (where, $0.90 \leq a \leq 1$, $0 \leq b \leq 0.5$, $0 \leq c \leq 0.05$, and $0 < \alpha < 2$); $Li_aNi_bE_cG_dO_2$ (where, $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where, $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1$ and $0.001 \leq b \leq 0.1$); $Li_aCoG_bO_2$ (where, $0.90 \leq a < 1$ and $0.001 \leq b \leq 0.1$); $Li_aMnG_bO_2$ (where, $0.90 \leq a \leq 1$ and $0.001 \leq b \leq 0.1$); $Li_aMn_2G_bO_4$ (where, $0.90 \leq a \leq 1$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where, $0 \leq f \leq 2$); $Li_{(3-f)}Fe_2(PO_4)_3$ (where, $0 \leq f \leq 2$); and $LiFePO_4$.

In the formulae above, A is selected from the group consisting of nickel (Ni), cobalt (Co), manganese (Mn), and combinations thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; F is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof Examples of the cathode active material are $LiCoO_2$, $LiMn_xO_{2x}(x=1, 2)$, $LiNi_{1-x}Mn_xO_{2x}(0<x<1)$, $LiNi_{1-x-y}Co_xMn_yO_2$ ($0 \leq x \leq 0.5$, $0 \leq y \leq 0.5$), and $FePO_4$.

The compounds listed above as cathode active materials may have a surface coating layer (hereinafter, "coating layer"). Alternatively, a mixture of a compound and a compound having a coating layer may be used. The coating layer may include at least one compound of a coating element selected from the group consisting of oxide, hydroxide, oxyhydroxide, oxycarbonate, and hydroxycarbonate of the coating element. These compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the cathode active material when a compound of the coating element is used. For example, the coating layer may be formed using a spray coating method, a dipping method, or the like. This is known to those skilled in the art, and thus a detailed description thereof will be omitted.

One or more embodiments include a lithium battery including the cathode including the composite cathode active material. The lithium battery may be manufactured in the following manner:

First, a cathode is prepared according to the above-described cathode formation method.

Next, an anode may be manufactured as follows: The anode may be manufactured in the same manner as the cathode, except for using an anode active material, instead of the composite cathode active material. A conducting agent, a binder, and a solvent used to prepare an anode active material composition may be the same as those used in the cathode active material composition.

For example, an anode active material, a conducting agent, a binder, and a solvent are mixed to prepare an anode active material composition, which is then coated directly on a copper current collector, thereby manufacturing an anode plate. Alternatively, the anode active material composition may be cast on a separate support, and then an anode active material film separated from the support may be laminated on a copper current collector to prepare an anode plate.

The anode active material may be any anode active material for a lithium battery available in the art. For example, the anode active material may include at least one selected from the group consisting of lithium metal, a metal that is alloyable with lithium, a transition metal oxide, a non-transition metal oxide, and a carbonaceous material.

Examples of the metal alloyable with lithium include Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof, except for Si), and a Sn—Y alloy (where Y is an alkali metal, an alkali earth metal, a Group XIII element, a Group XIV element, a transition metal, a rare earth element, or a combination thereof, except for Sn). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof Examples of the transition metal oxide are a lithium titanium oxide, a vanadium oxide, and a lithium vanadium oxide.

Examples of the non-transition metal oxide include $SnO_2$ and $SiO_x$ $(0<x<2)$.

Examples of the carbonaceous material are crystalline carbon, amorphous carbon, and mixtures thereof. Examples of the crystalline carbon are graphite, such as natural graphite or artificial graphite. Examples of the amorphous carbon include soft carbon (carbon sintered at low temperatures), hard carbon, mesophase pitch carbides, and sintered corks.

The amounts of the anode electrode active material, the conducting agent, the binder, and the solvent are those that are generally used in the manufacture of a lithium battery.

Next, a separator to be disposed between the cathode and the anode is prepared. The separator for the lithium battery may be any separator that is commonly used in lithium batteries. The separator may have low resistance to migration of ions in an electrolyte and have an excellent electrolyte-retaining ability. Examples of the separator include glass fiber, polyester, Teflon, polyethylene, polypropylene, polytetrafluoroethylene (PTFE), and combinations thereof, each of which may be a non-woven or woven fabric. For example, a rollable separator, including polyethylene or polypropylene, may be used in a lithium ion battery. A separator with a good organic electrolyte solution-retaining ability may be used in a lithium ion polymer battery. For example, the separator may be manufactured in the following manner:

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

The polymer resin used to manufacture the separator may be any material that is commonly used as a binder for electrode plates. Examples of the polymer resin include a vinylidenefluoride/hexafluoropropylene copolymer, PVDF, polyacrylonitrile, polymethyl methacrylate, and mixtures thereof Next, an electrolyte is prepared.

For example, the electrolyte may be an organic electrolyte solution. Alternately, the electrolyte may be in a solid phase. Non-limiting examples of the electrolyte include lithium oxide and lithium oxynitride. Any material available as a solid electrolyte in the art may be used. The solid electrolyte may be formed on the anode by, for example, sputtering.

In some embodiments, an organic electrolyte solution may be prepared as follows: The organic electrolyte solution may be prepared by dissolving a lithium salt in an organic solvent.

The organic solvent may be any solvent available as an organic solvent in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, and mixtures thereof The lithium salt may be any material available as a lithium salt in the art. Non-limiting examples of the lithium salt are $LiPF_6$, $LiBF_4$, $LiSbF_6$, $LiAsF_6$, $LiClO_4$, $LiCF_3SO_3$, Li(CF3SO2)2N, LiC4F9SO3, LiAlO2, LiAlCl4, LiN(CxF2x+1SO2)(CyF2y+1SO2) (where, x and y are natural numbers), LiCl, LiI, and mixtures thereof.

Figure 4:
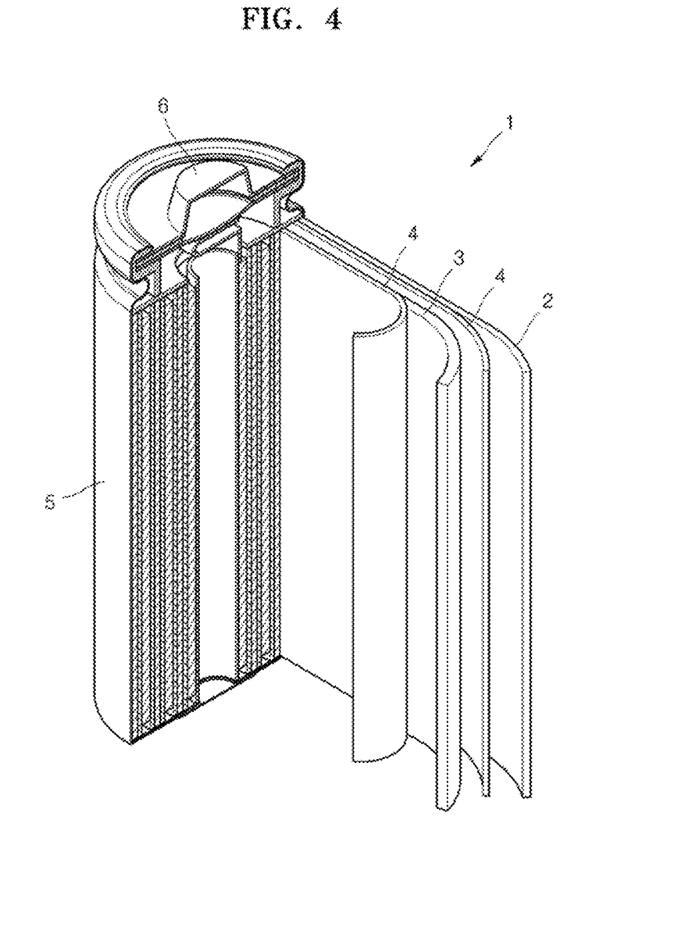
FIG. 4 is a schematic view of a lithium battery according to an embodiment.

Referring to FIG. 4, a lithium battery 1 according to an embodiment includes a cathode 3, an anode 2, and a separator 4. The cathode 3, the anode 2, and the separator 4 are wound or folded, and then sealed in a battery case 5. Then, the battery case 5 is filled with an organic electrolyte solution and sealed with a cap assembly 6, thereby completing the manufacture of the lithium battery 1. The battery case 5 may be a cylindrical type, a rectangular type, or a thin-film type battery case. For example, the lithium battery 1 may be a thin-film type battery. The lithium battery 1 may be a lithium ion battery.

A separator may be interposed between a cathode and an anode to form a battery assembly. Alternatively, the battery assembly may be stacked in a bi-cell structure and impregnated with an electrolyte solution. The resultant is put into a pouch and hermetically sealed, thereby completing the manufacture of a lithium ion polymer battery.

Alternatively, a plurality of battery assemblies may be stacked to form a battery pack, which may be used in any device that operates at high temperatures and requires high output, for example, in a laptop computer, a smartphone, an electric vehicle, and the like.

The lithium battery may have an improved lifetime and high rate characteristics, and thus may be applicable to an electric vehicle (EV), for example, to a hybrid vehicle such as plug-in hybrid electric vehicle (PHEV). The lithium battery may be applicable to the high-power storage field, for example, to electric bicycles, power tools, and the like.

Hereinafter, the present embodiments will be described in further detail with reference to the following examples. However, these examples are for illustrative purposes only and are not intended to limit the scope of the present embodiments.

Preparation of Composite Cathode Active Material

Example 1

Composite Cathode Active Material

8 L of distilled water was added to a 10 L reactor having a stirrer and an overflow pipe, and the distilled water was stirred at a rate of 600 rpm while maintaining a temperature of the reactor at 40° C.

A transition metal aqueous solution at a concentration of 2.4 M including a nickel sulfate, a cobalt sulfate, and a manganese sulfate at a molar ratio of about 0.25:0.10:0.65 was supplied at a rate of about 400 ml/hr, ammonia water at a concentration of 7.75 M was supplied at a rate of about 99 ml/hr, a 4.80 M NaOH solution was supplied at a rate of about 400 ml/hr to adjust pH of the reacting solution, and a 0.5 mol % (0.25 M) glucose solution was supplied at a rate of about 24 ml/hr as a reducing agent to the reactor. The pH of the reacting solution was maintained at 12.3. An average residence time of the reacting solution in the reactor was controlled to be 8 hours by controlling a flow rate, and when the reaction reached a steady state, a solution including a composite cathode active material precursor was continuously obtained through the overflow pipe.

The composite cathode active material precursor was collected from the solution, washed, filtered, and dried in a hot-air drier at a temperature of 105° C. for 24 hours to obtain a composite cathode active material precursor (a composite nickel cobalt manganese hydroxide, Ni0.25Co0.10Mn0.65 (OH)2).

The composite cathode active material precursor and a lithium carbonate (Li2CO3) were mixed so that a molar ratio of a transition metal and lithium may be 1.0:1.30, and then the mixture was calcined in the air at a temperature of 900° C. for about 10 hours to prepare a composite cathode active material represented by Li[Li0.3(Ni0.25Co0.1Mn0.65)0.7]O2.

Example 2

Composite Cathode Active Material

A composite cathode active material represented by Li[Li0.35(Ni0.25Co0.1Mn0.65)0.65]O2 was prepared in the same manner as used in Example 1, except that the composite cathode active material precursor and a lithium carbonate (Li2CO3) were mixed in a molar ratio of a transition metal and lithium to be 1.0:1.35.

Example 3

Composite Cathode Active Material

A composite cathode active material represented by Li[Li0.4(Ni0.25Co0.1Mn0.65)0.6]O2 was prepared in the same manner as used in Example 1, except that the composite cathode active material precursor and a lithium carbonate (Li2CO3) were mixed in a molar ratio of a transition metal and lithium to be 1.0:1.40.

Figure 2A:
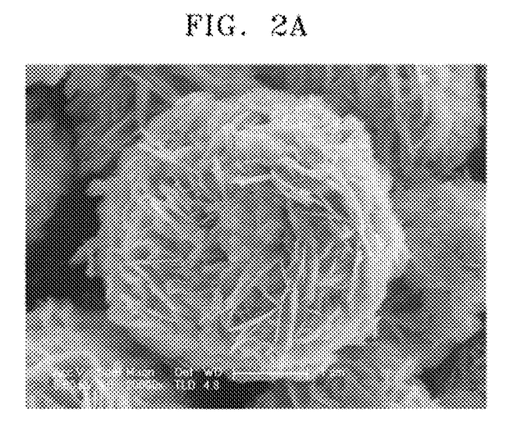
FIG. 2A is a scanning electron microscope (SEM) image of a composite cathode active material precursor prepared in Example 3.

As shown in FIG. 2A, the composite cathode active material precursor prepared in Example 3 comprises secondary particles of a spherical shape, and the secondary particles are formed by binding primary particles of a plate shape.

Figure 3A:
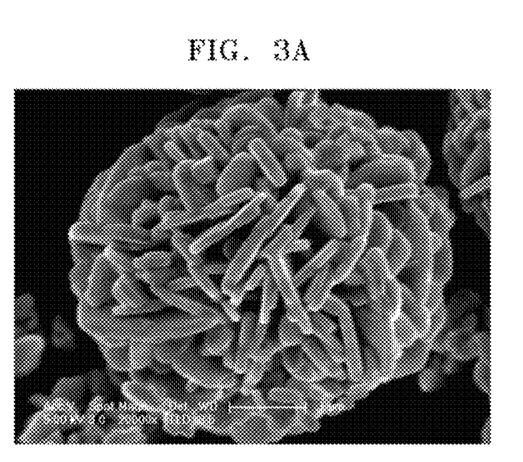
FIG. 3A is an SEM image of the composite cathode active material prepared in Example 3.

As shown in FIG. 3A, the composite cathode active material prepared in Example 3 comprises secondary particles of a spherical shape, and the secondary particles are formed by binding primary particles of a plate shape.

A thickness of the primary particles of a plate shape was about 150 nm.

Example 4

Composite Cathode Active Material

A composite cathode active material represented by Li[Li0.45(Ni0.25Co0.1Mn0.65)0.55]O2 was prepared in the same manner as used in Example 1, except that the composite cathode active material precursor and a lithium carbonate (Li2CO3) were mixed in a molar ratio of a transition metal and lithium to be 1.0:1.45.

Comparative Example 1

A composite cathode active material was prepared in the same manner as used in Example 1, except that a 1.0 mol % glucose solution was supplied at a rate of about 96 ml/hr as a reducing agent to the reactor. However, a composite cathode active material was not obtained.

Comparative Example 2

A composite cathode active material was prepared in the same manner as used in Example 1, except that a 1.0 mol % glucose (0.5 M) solution was supplied at a rate of about 48 ml/hr as a reducing agent to the reactor. However, a composite cathode active material was not obtained.

Comparative Example 3

A composite cathode active material was prepared in the same manner as used in Example 1, except that a reducing agent was not added.

Comparative Example 4

A composite cathode active material was prepared in the same manner as used in Example 2, except that a reducing agent was not added.

Comparative Example 5

A composite cathode active material was prepared in the same manner as used in Example 3, except that a reducing agent was not added.

Figure 2B:
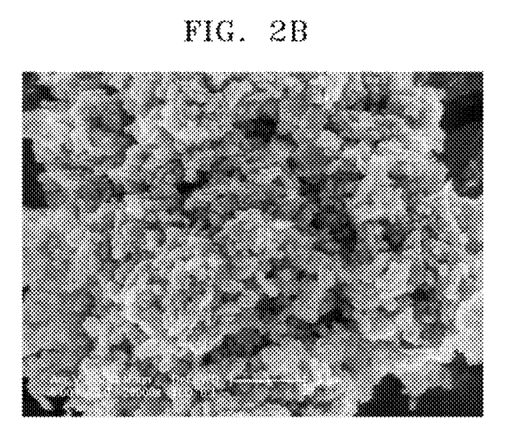
FIG. 2B is an SEM image of a composite cathode active material precursor prepared in Comparative Example 3.
Figure 3B:
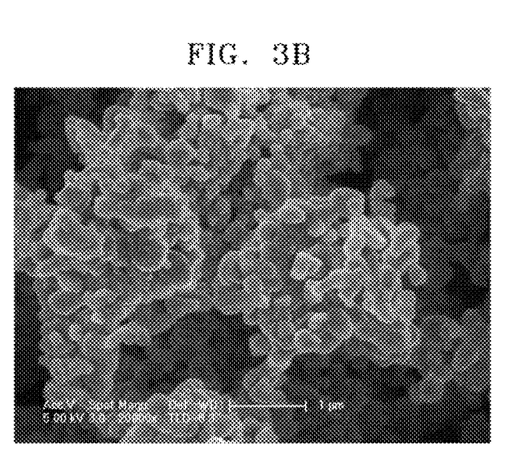
FIG. 3B is an SEM image of the composite cathode active material prepared in Comparative Example 3.

As shown in FIG. 2B, the composite cathode active material precursor prepared in Comparative Example 5 includes secondary particles formed by binding primary particles having a spherical shape. A shape of the secondary particles was irregular. As shown in FIG. 3B, the composite cathode active material prepared in Comparative Example 5 includes secondary particles formed by binding primary particles having spherical shape. A shape of the secondary particles was irregular.

Comparative Example 6

A composite cathode active material was prepared in the same manner as used in Example 4, except that a reducing agent was not added.

Preparation of Cathode and Lithium Battery

Example 5

A powder of the composite cathode active material powder prepared in Example 1 and a carbon conducting agent (Super-P; Timcal Ltd.) were uniformly mixed at a weight ratio of 90:5, and then a polyvinylidene fluoride (PVDF) binder solution was added to prepare an active material slurry including the active material, the carbon conducting agent, and the binder at a weight ratio of 90:5:5.

An aluminum foil having a thickness of about 15 μm was coated with the active material slurry and dried to prepare a cathode plate, and the cathode plate was additionally vacuum-dried to prepared a coin cell (CR2016 type) having a diameter of about 12 mm.

In a process of preparing the cell, lithium was used as a counter electrode, a polypropylene separator (Celgard 3501) was used as a separator, and a solution including 1.3 M LiPF6 dissolved in a mixed solvent of ethylene carbonate and diethylene carbonate (at a volume ratio of 3:7) was used as an electrolyte.

Examples 6 to 8

Lithium batteries were prepared in the same manner as used in Example 5, except that the composite cathode active materials prepared in Examples 2 to 4 were used, respectively.

Comparative ExampleS 7 TO 10

Lithium batteries were prepared in the same manner as used in Example 5, except that the composite cathode active materials prepared in Comparative Examples 3 to 6 were used, respectively.

Evaluation Example 1

XRD Measurement

Figure 1:
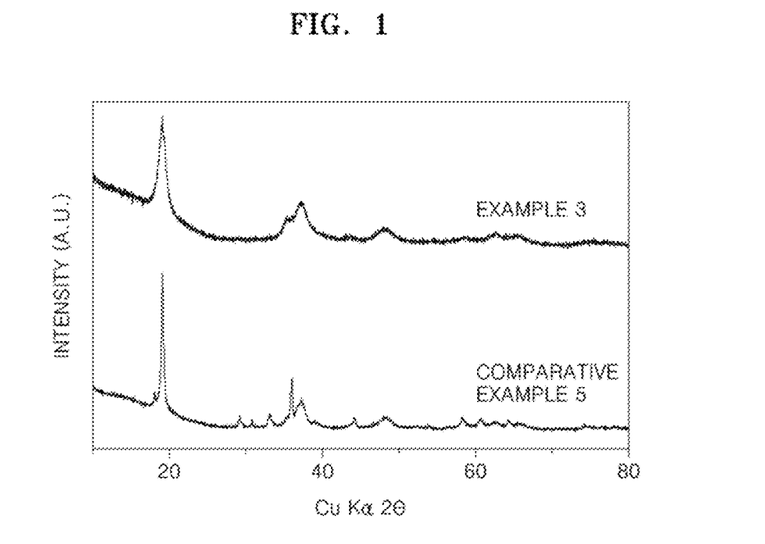
FIG. 1 is an X-ray diffraction spectrum of composite cathode active materials prepared in Example 3 and Comparative Example 5.

XRD spectra of the composite cathode active material precursors prepared in Example 3 and Comparative Example 5 were measured, and some of the results are shown in FIG. 1. The instrument used in the measurement was Model: sdik-j1-066 from Philips. An X-ray source was Cu kα 8048 eV.

As shown in FIG. 1, the composite cathode active material precursor prepared in Example 3 had a first peak observed at a diffraction angle (2θ) of 19.1°±0.50° and a second peak observed at a diffraction angle (2θ) of about 37.2°±0.50°, where an intensity ratio (I2/I1) of an intensity of the second peak (I2) to an intensity of the first peak (I1) was about 0.48. The composite cathode active material precursor prepared in Comparative Example 5 had an intensity ratio (I2/I1) of about 0.28.

Also, as shown in FIG. 1, all of the peaks corresponding to Mn3O4 observed from about in 30° to 40° the XRD spectrum of the composite cathode active material precursor prepared in Comparative Example 5 were not observed in the XRD spectrum of the composite cathode active material precursor prepared in Example 3. Thus, it was confirmed that a formation of Mn3O4 was suppressed by adding a reducing agent.

Evaluation Example 3

Measurement of Specific Surface Area

Specific surface areas of the composite cathode active materials prepared in Examples 1 to 4 and Comparative Examples 3 to 6 were measured, and some of the results are shown in Table 1. The specific surface areas were measured by using a nitrogen absorption type Brunauer-Emmett-Teller (BET) measuring equipment.

TABLE 1

| | Specific Surface Area [m$^2$/g] |
|---|---|
| Example 3 | 4.093 |
| Example 4 | 4.165 |
| Comparative Example 5 | 2.971 |
| Comparative Example 6 | 2.780 |

As shown in Table 1, the composite cathode active materials prepared in Examples 3 and 4 had increased specific surface areas compared to those of the composite cathode active material prepared in Comparative Examples 5 and 6. The composite cathode active materials prepared in other Examples had the similar results.

Evaluation Example 3

Measurement of Average Particle Diameter (D50)

Average particle diameters (D50) of the secondary particles of the composite cathode active materials prepared in Examples 1 to 4 and Comparative Examples 3 to 6 were measured, and some of the results are shown in Table 2. The average particle diameters were measured by using a laser diffraction particle size analyzer (LS 13 320 Ensol instrument).

TABLE 2

|  | Average Particle Diameter (D50) [μm] |
|---|---|
| Example 3 | 4.380 |
| Example 4 | 3.749 |

As shown in Table 2, the composite cathode active materials prepared in Examples 3 and 4 had an average particle diameter of about 5 μm or less. The composite cathode active materials prepared in other Examples had the similar results.

Evaluation Example 4

Evaluation of Charging/Discharging Characteristics

The coin cells prepared in Examples 5 to 8 and Comparative Examples 7 to 10 were charged with a constant current of 0.1 C until a voltage was 4.7 V (vs. Li) and discharged with a constant current of 0.1 C until a voltage was 2.5 V (vs. Li) at a temperature of 25° C. (1st cycle).

Then, the coin cells were charged with a constant current of 0.1 C to a voltage of 4.6 V (vs. Li) and discharged with a constant current of 0.2 C to a voltage of 3.0 V (vs. Li) at a temperature of 25° C. (2nd cycle).

Next, the coin cells were charged with a constant current of 0.1 C to a voltage of 4.6 V (vs. Li) and discharged with a constant current of 0.33 C, 1 C, 2 C, or 3 C, respectively, to a voltage of 2.5 V (vs. Li) at a temperature of 25° C.

Subsequently, the coin cells were charged with a constant current of 0.5 C to a voltage of 4.6 V (vs. Li) and discharged with a constant current of 0.5 C to a voltage of 2.5 V (vs. Li) at a temperature of 25° C., and the charging/discharging cycle was repeated 30 times.

Some of the results of the charging/discharging test are shown in Table 3. A charging/discharging efficiency and a capacity retention rate are represented by Equation 1 or 2.

Initial charging/discharging efficiency [%]=[a discharge capacity at 1st cycle/a charge capacity at 1st cycle]×100     <Equation 1>

Capacity retention rate [%]=[a discharge capacity at 30th cycle (discharging at 0.5 C)/a discharge capacity at 1st cycle (discharging at 0.5 C)]×100     <Equation 2>

TABLE 3

|  | Charge capacity after 1st cycle [mAh/g] | Discharge capacity after 1st cycle [mAh/g] | Initial charging/ discharging efficiency [%] | Capacity retention rate [%] |
|---|---|---|---|---|
| Example 5 | 296 | 260 | 88 | 97 |
| Example 7 | 321 | 264 | 82 | 96 |
| Comparative Example 9 | 316 | 256 | 81 | 95 |

As shown in Table 3, the lithium batteries manufactured by using the composite cathode active materials prepared in Examples 5 and 7 have improved initial efficiencies, life characteristics, and discharge capacities compared to those of the lithium battery manufactured by using the composite cathode active material prepared in Comparative Example 9.

As described above, according to the one or more of the above embodiments, a lithium battery may have improved life characteristics by including a composite cathode active material prepared by using a novel method.

It should be understood that the example embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present embodiments as defined by the following claims.

What is claimed is:

1. A method of preparing a composite cathode active material, the method comprising:
   mixing a transition metal source and a reducing agent to prepare a composite cathode active material precursor; and
   mixing and calcining the composite cathode active material precursor and a lithium source to prepare a lithium transition metal oxide,
   wherein the reducing agent is supplied at about 0.015 mole/hr or less with respect to 1 mole/hr of the transition metal source.

2. The method of claim 1, wherein the mixing of the transition metal source and the reducing agent is performed by continuously or intermittently supplying each of a first solution including a transition metal source and a second solution including the reducing agent to a reactor.

3. The method of claim 2, wherein a concentration of the reducing agent in the second solution is about 350 mM or less.

4. The method of claim 2, wherein the second solution is supplied at about 40 ml/hr or less.

5. The method of claim 2, wherein a concentration of the transition metal source in the first solution is about 2 M or more.

6. The method of claim 2, wherein the first solution is supplied at about 300 ml/hr or more.

7. The method of claim 1, wherein a molar ratio of the composite cathode active material precursor and the lithium source being mixed is from about 1:1.05 to about 1:1.50.

8. The method of claim 1, wherein, in an X-ray diffraction (XRD) spectrum of the cathode active material precursor, a first peak is observed at a diffraction angle (2θ) of about 19.1°±0.50°, a second peak is observed at a diffraction angle (2θ) of about 37.2°±0.50°, and an intensity ratio ($I_2/I_1$) of the second peak to the first peak is about 0.30 or more.

9. The method of claim 1, wherein the reducing agent is a reducing sugar.

10. The method of claim 1, wherein the reducing agent is at least one selected from the group consisting of glucose, glyceraldehydes, galactose, lactose, maltose, and fructose.

11. The method of claim 1, wherein the lithium metal compound comprises a compound represented by Formula 1:

$$Li[Li_xNi_aCo_bMn_c]O_{2+d}$$     <Formula 1> wherein, in Formula 1, x+a+b+c=1; 0<x≤0.5, 0<a<1, 0<b<1, 0<c<1, and 0≤d≤0.1.

12. The method of claim 1, wherein the lithium transition metal oxide comprises a compound represented by Formula 2:

$$pLi_2MnO_3 \cdot (1-p)LiNi_aCo_bMn_cO_2 \qquad \text{<Formula 2>}$$

wherein, in Formula 2, 0<p<1, 0<a<1, 0<b<1, 0<c<1, and a+b+c=1.

13. The method of claim 1, wherein the calcining is performed in an air atmosphere at a temperature of about 700° C. to about 1000° C. for about 5 hours to about 300 hours.

14. A composite cathode active material comprising a lithium transition metal oxide represented by Formula 1, wherein secondary particles of the composite cathode active material are formed by binding primary particles of the composite cathode active material, an average particle diameter (D50) of the secondary particles is 5 μm or less, a specific surface area of the composite cathode active material is about 3.0 m²/g or more, an initial discharge capacity of the composite cathode active material is about 260 mAh/g or more, and the primary particles have a plate shape, wherein the composite cathode active material is a calcined product of a cathode active material precursor and a lithium source, wherein, in an X-ray diffraction (XRD) spectrum of the cathode active material precursor, a first peak is observed at a diffraction angle (2θ) of about 19.1°±0.50°, a second peak is observed at a diffraction angle (2θ) of about 37.2°±0.50°, and an intensity ratio (I2/I1) of the second peak to the first peak is about 0.30 or more:

$$Li[Li_xNi_aCo_bMn_c]O_{2+d} \qquad \text{<Formula 1>}$$

wherein, in Formula 1, x+a+b+c=1; 0<x≤0.5, 0<a<1, 0<b<1, 0<c<1, and 0≤d≤0.1.

15. The composite cathode active material of claim 14, wherein a thickness of the primary particles is about 200 nm or less.

16. The composite cathode active material of claim 14, wherein an aspect ratio of a thickness and a length of the primary particles is about 1:5 or greater.

17. A cathode comprising the composite cathode active material of claim 14.

18. A lithium battery containing the cathode of claim 17.

* * * * *